Nov. 20, 1951     M. G. MORGAN     2,575,675
FOAM MAKER FOR CLEANERS
Filed Dec. 21, 1948
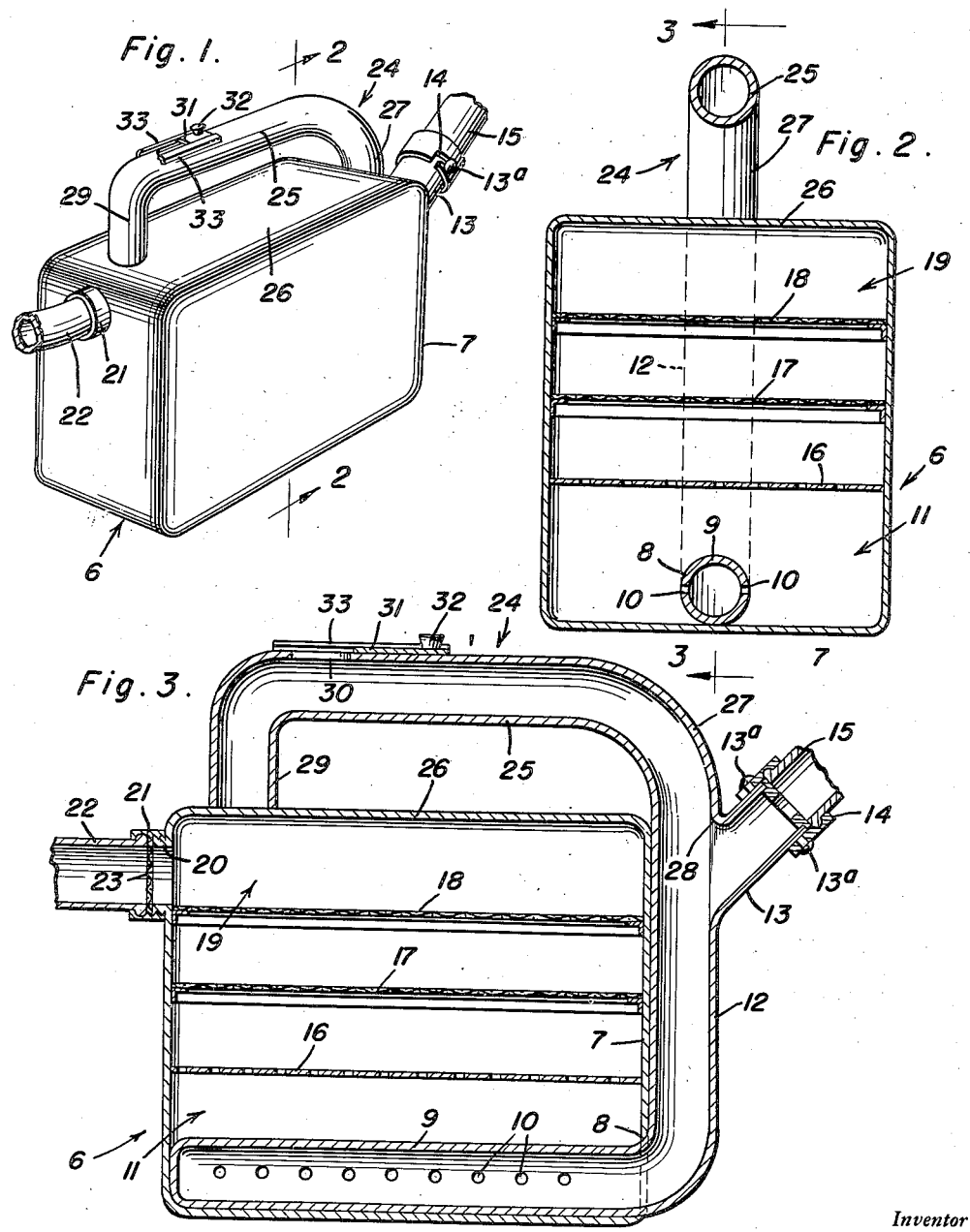
Inventor
Marcil G. Morgan,
By 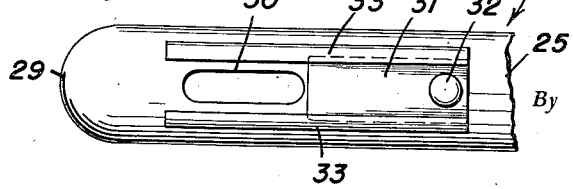
Attorneys Patented Nov. 20, 1951

2,575,675

UNITED STATES PATENT OFFICE 2,575,675

FOAM MAKER FOR CLEANERS

Marcil G. Morgan, Nashville, Tenn.

Application December 21, 1948, Serial No. 66,548

2 Claims. (Cl. 261—63)

The present invention relates to a simple and expedient machine, of a hand-carried household type, which is aptly constructed for making suds suitable for effectively cleaning rugs and upholstery.

It is a matter of common knowledge that there are many good liquid preparations on the market of a saponaceous character which are being successfully used in producing a so-called "foam" which is successfully employable in cleaning and brightening rug and upholstery surfaces. Generally, the liquid preparation is poured into a bowl or other handy container and either an egg beater or a sponge is employed for swish-swashing, agitating and converting the liquid to the desired soapy consistency required for household cleaning purposes. This method of mixing liquid rug cleaners is tedious, unsatisfactory, and will, it is felt, eventually become an obsolete method of doing the wanted job. As a matter of fact, it is the purpose of the present invention to provide a device or machine which will enable the expected results to be attained with a minimum amount of expended time and effort.

More specifically, the invention, which has now been successfully made and used, comprises a simple and practical box-like liquid containing and agitating tank which has a foam discharge nozzle and hose on one end, and a pressure delivery conduit on the other end, the latter being useful as a filler pipe for pouring the liquid into the tank and having the additional function of a pressure delivery conduit which is such that a hose from an ordinary vacuum cleaner may be attached thereto.

Another object of the invention is to provide a tank having the stated structural features and, in addition, having a hollow handle, said handle having the additional function of an air pressure by-pass and having a regulable valved port for venting the incoming pressure into the atmosphere in a manner to thus regulate the degree of agitation of the stated liquid cleaner.

Other objects and advantages will become more readily apparent from the following description and the accompanying illustrative drawings.

In the drawings, wherein like numerals are employed to designate like parts throughout the views:

Figure 1 is a perspective view of a handy foam or suds maker constructed in accordance with this invention;

Figure 2 is a vertical section on the line 2—2 of Figure 1, looking in the direction of the arrows;

Figure 3 is a longitudinal section at right angles to Figure 2 taken on the section line 3—3 of Figure 2; and, Figure 4 is an enlarged fragmentary top plan of the valved end portion of the carrying and venting handle.

The box-like casing or tank, which is of suitable shape and proportions and which is here shown as generally rectangular, is denoted by the numeral 6. Adjacent the bottom and in the end wall 7 is an opening 8 to accommodate a branch of a substantially U-shaped pipe or conduit. This branch, 9, extends through the opening and into the interior of the tank, where it is apertured to provide a multiplicity of air discharge ports 10 operable in the lower compartment 11. The vertical branch 12 is exteriorly disposed and provided with an oblique neck 13 which serves to enable the user to pour the liquid cleaning preparation from a bottle (not shown) in which it is marketed into the compartment or chamber 11 by way of branches 12 and 9 respectively. In addition, said neck is constructed with headed pins 13a to fit into bayonet slots on a collar 14 carried by a vacuum cleaner hose 15. This is the type hose which is attachable to the pressure side of the vacuum cleaner so that when the vacuum cleaner is turned "on," the pressure is fed by way of the stated conduit into the liquid containing tank for agitating the liquid in the tank. Suitable baffle elements are provided on the interior of the tank so that the pressured air, acting on the baffles, serves to transform the liquid into the desired soapy suds or foam. In the bottom there is a horizontal perforated baffle plate 16 defining the lower chamber 11. Above the plate, I provide vertically superposed and spaced screens or baffles 17 and 18 and the upper screen or defines a discharge compartment 19 for the "foam." In fact, the tank at this point has a discharge neck 20 which is screw-threaded to accommodate a collar 21 which serves to hold the foam delivery hose 22 in place. This assemblage also serves to removably maintain the small disk screen 23 in place. The arrangement also allows the screen to be removed from time to time for cleaning and to minimize the clogging of the output or discharge neck 20.

I provide, as stated, a unique handle unitarily denoted by the numeral 24. This handle is a part of said U-shaped conduit and is hollow and the portion 25 is located in spaced relation above the top 26 where it may be conveniently grasped in the hand for lifting, lowering, and carrying. The branch 27 is attached to and communicates with the branch 12, as at the point 28 in Figure 3. The short branch 29 is attached to the exterior of the top 26 but is devoid of communication with the interior of the liquid agitating tank. The branch 25 has a vent or discharge port 30 for air and this is adjustably or wholly closable by a slide plate valve 31 operated by a finger grip 32, said valve plate being slidable in appropriate guide tracks 33.

Normally, the valve 31 is closed and the hose 15 is detached from the pressure delivery pipe. Thus, to start with, the liquid from the bottle (not shown) is poured into the chamber 11, using the U-shaped pipe or conduit as a filler pipe. Approximately one pint of liquid cleaning preparation is poured into the chamber 11. Then the hose 15 is attached at one end to the pressure pipe and at the opposite end to the pressure side of an ordinary household vacuum cleaner (not shown). When the vacuum cleaner is turned "on," the incoming pressure obviously circulates and agitates the liquid cleaning preparation and the latter is transformed or converted into a foam which is eventually built up and forced out through the outlet 20 and the delivery hose 22. As stated, at this time the valve 31 is closed. By opening the valve 31, the incoming pressure is by-passed through the hollow handle and vented into the atmosphere and it will obviously take this course because it is the course of least resistance and, hence, when one wants to stop the agitation and delivery of cleaning suds, this is accomplished by partly or wholly opening the valve 31 in an obvious manner. It is novel, it is believed, to provide a carrying handle which has a venting valve and which serves as a by-pass for turning the suds maker "on" and "off."

A check ring 34 may, if desired, be fitted into the conduit neck 13 to intercept the pressured air stream.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A foam maker for home use comprising a portable container for a liquid rug cleaning preparation, said container embodying, top, bottom, side and end walls, all of said walls being flat and substantially free of external projections, one end wall being provided, adjacent said bottom wall, with an opening, the other end wall being provided with foam discharging means, baffle means mounted in said container, a one-piece substantially U-shaped pipe embodying a perforated lower branch projecting horizontally through said opening and wholly into the container, a horizontal top branch exteriorly overlying the top wall of the container and spaced therefrom and having a downturned terminal portion connected to and closed by said top wall, said horizontal branch constituting a carrying handle, and an intermediate vertical branch outwardly of and paralleling and contacting the adjacent end wall, said vertical branch having an outwardly projecting complemental neck, the latter serving as a liquid filler neck on the one hand and an air hose attaching neck on the other hand, said top branch being provided with an air relief port, and manually regulable valve means mounted on said top branch for opening and closing said port.

2. A foam maker for home use comprising a portable container for a liquid rug cleaning preparation, said container embodying top, bottom, side and end walls, all of said walls, exteriorly, being substantially flat and approximately free of external projections, one vertical end wall being provided, adjacent the bottom wall, with an opening, the other end wall being provided adjacent the top wall with foam discharging means, baffle means mounted on the interior of said container, a one-piece substantially U-shaped pipe embodying an upper horizontal branch overlying the top wall in spaced parallelism and having a downturned terminal end attached to said top wall inwardly of the adjacent vertical end wall, said horizontal branch functioning as a carrying handle for the complete device, the lower branch of said pipe extending through the opening adjacent said bottom wall, being perforated and extending into the container and having its terminal end closed and terminating in the container adjacent to the coacting end wall of the container, the intermediate branch of said pipe being parallel to and in direct contact with the exterior of the adjacent end wall of the container and being provided with an outstanding neck, the latter serving as a liquid filler neck, whenever necessary or desired, or alternatively as an air hose attaching neck, the top wall of the upper branch being provided, adjacent said downturned end, with an opening constituting a vent, and a slide valve slidably mounted on said upper branch and serving to open and close said vent.

MARCIL G. MORGAN.

REFERENCES CITED

The following references are of record in the file of this patent:

UNITED STATES PATENTS

| Number | Name | Date |
| --- | --- | --- |
| 488,881 | Falley | Dec. 27, 1892 |
| 1,103,789 | Macey | July 14, 1914 |
| 1,244,139 | Stathakis | Oct. 23, 1917 |
| 1,438,926 | Leet | Dec. 12, 1922 |
| 1,753,429 | Rice | Apr. 8, 1930 |
| 1,938,497 | Pogue | Dec. 5, 1933 |
| 2,345,658 | Doughman | Apr. 4, 1944 |

FOREIGN PATENTS

| Number | Country | Date |
| --- | --- | --- |
| 224,548 | Great Britain | Apr. 7, 1926 |